(12) United States Patent
Sarir et al.

(10) Patent No.: US 11,443,066 B2
(45) Date of Patent: Sep. 13, 2022

(54) DEVICES, SYSTEMS AND METHODS FOR DETERMINING SUGGESTED ACTION INITIATION TIMES FOR INTERACTIONS

(71) Applicant: The Toronto-Dominion Bank, Toronto (CA)

(72) Inventors: Nasim Sarir, Toronto (CA); John William Thomas, Toronto (CA); Simona Heath, Toronto (CA); Diane Lee, Toronto (CA); Richard Thomas, Toronto (CA); John Jong-Suk Lee, Toronto (CA); Arun Victor Jagga, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 1280 days.

(21) Appl. No.: 15/720,549

(22) Filed: Sep. 29, 2017

(65) Prior Publication Data

US 2018/0096311 A1    Apr. 5, 2018

Related U.S. Application Data

(60) Provisional application No. 62/402,529, filed on Sep. 30, 2016.

(51) Int. Cl.
*G06Q 10/00* (2012.01)
*G06Q 20/00* (2012.01)
(Continued)

(52) U.S. Cl.
CPC .......... *G06F 21/629* (2013.01); *G06F 3/0482* (2013.01); *G06F 3/0484* (2013.01);
(Continued)

(58) Field of Classification Search
USPC ...................................... 705/7.26, 7.11–7.42
See application file for complete search history.

(56) References Cited

U.S. PATENT DOCUMENTS 7,930,248 B1 * 4/2011 Lawson ................. G06Q 20/10
705/35
8,744,959 B2 * 6/2014 Smith ................... G06Q 20/102
705/40

(Continued)

*Primary Examiner* — Mustafa Iqbal
(74) *Attorney, Agent, or Firm* — Duane Morris LLP

(57) ABSTRACT

This application provides for determining a suggested action initiation time for an interaction with an interacting party. Some aspects comprise: determining an interaction settlement due date; querying an interaction database storing historical interaction records to determine if there is one or more of the historical interaction records related by one or more factors to the interacting party; retrieving, from the interaction database (where there is one or more historical interaction record(s) related to the interacting party), historical interaction data; determining from the retrieved historical interaction data a predicted processing time for the interaction; and determining, based on the interaction settlement due date and the predicted processing time, the suggested action initiation time. The suggested action initiation time comprises a time by which an action for settling the interaction with the interacting party is suggested to be initiated to effect settlement of the interaction by the interaction settlement due date.

20 Claims, 8 Drawing Sheets

(51) Int. Cl.

| | |
|---|---|
| *G06Q 30/00* | (2012.01) |
| *G06Q 50/00* | (2012.01) |
| *G06F 16/00* | (2019.01) |
| *G06F 11/00* | (2006.01) |
| *G06F 3/00* | (2006.01) |
| *H04W 12/00* | (2021.01) |
| *G06F 21/00* | (2013.01) |
| *H04L 67/00* | (2022.01) |
| *G06F 21/62* | (2013.01) |
| *G06F 16/23* | (2019.01) |
| *G06F 16/93* | (2019.01) |
| *G06F 16/435* | (2019.01) |
| *G06F 16/2458* | (2019.01) |
| *G06F 16/2455* | (2019.01) |
| *H04L 67/50* | (2022.01) |
| *H04W 12/08* | (2021.01) |
| *H04W 12/086* | (2021.01) |
| *G06F 3/0482* | (2013.01) |
| *G06F 21/53* | (2013.01) |
| *G06Q 30/04* | (2012.01) |
| *G06Q 20/38* | (2012.01) |
| *H04W 12/06* | (2021.01) |
| *G06Q 20/10* | (2012.01) |
| *G06Q 20/14* | (2012.01) |
| *G06Q 10/06* | (2012.01) |
| *G06Q 10/08* | (2012.01) |
| *G06Q 10/10* | (2012.01) |
| *G06F 3/0484* | (2022.01) |
| *G06F 3/0488* | (2022.01) |
| *G06F 3/14* | (2006.01) |
| *H04L 67/1097* | (2022.01) |
| *G06F 11/30* | (2006.01) |
| *G06Q 20/40* | (2012.01) |
| *G06Q 50/22* | (2018.01) |

(52) U.S. Cl.
CPC .............. *G06F 3/0488* (2013.01); *G06F 3/14* (2013.01); *G06F 11/3006* (2013.01); *G06F 11/3089* (2013.01); *G06F 16/23* (2019.01); *G06F 16/2462* (2019.01); *G06F 16/24554* (2019.01); *G06F 16/435* (2019.01); *G06F 16/93* (2019.01); *G06F 21/53* (2013.01); *G06Q 10/06316* (2013.01); *G06Q 10/087* (2013.01); *G06Q 10/105* (2013.01); *G06Q 10/1097* (2013.01); *G06Q 20/00* (2013.01); *G06Q 20/102* (2013.01); *G06Q 20/14* (2013.01); *G06Q 20/38* (2013.01); *G06Q 30/04* (2013.01); *H04L 67/1097* (2013.01); *H04L 67/22* (2013.01); *H04W 12/06* (2013.01); *H04W 12/08* (2013.01); *H04W 12/086* (2021.01); *G06Q 20/4016* (2013.01); *G06Q 50/22* (2013.01)

(56) References Cited

U.S. PATENT DOCUMENTS

| | | | |
|---|---|---|---|
| 10,387,878 B2* | 8/2019 | Johnsrud | G06Q 20/401 |
| 10,929,821 B2* | 2/2021 | Raouda El-Balah | G06Q 20/20 |
| 2011/0166994 A1* | 7/2011 | Ross | G06Q 20/40 |
| | | | 705/40 |
| 2015/0012414 A1* | 1/2015 | Akashika | G06Q 20/3678 |
| | | | 705/38 |

* cited by examiner

DEVICES, SYSTEMS AND METHODS FOR DETERMINING SUGGESTED ACTION INITIATION TIMES FOR INTERACTIONS

CROSS-REFERENCE TO RELATED APPLICATIONS

The present application claims priority from U.S. Provisional Patent Application No. 62/402,529 filed on Sep. 30, 2016, the entire contents of which are incorporated herein by reference.

FIELD

The following relates generally to methods, systems and devices for determining suggested action initiation times for interactions. More specifically, the following relates to methods, systems and devices for determining suggested action initiation times for interactions conducted over networks based on historical interaction data, for settling interactions by interaction settlement due dates.

BACKGROUND

Interactions between parties at times have associated dates by which settlement must be effected. For example, it may be necessary to complete or effect transfer of digital application documents to an interacting party (e.g., a job application form being digitally transmitted to a company) by a particular due date to avoid a penalty (such as the application not being considered for the job). In some instances, a digital act to effect settlement, such as the digital transmission of application documents, may require a certain amount of processing time before settlement with an interacting party (e.g., receipt of application documents by a potential employer) is effected. Where an action to initiate settlement takes place on a settlement due date, settlement may not actually be effected until sometime after the settlement due date, in which case a penalty associated with late settlement may be incurred.

SUMMARY

In an aspect of the present application there is provided a computing device for determining a suggested action initiation time for an interaction conducted over a network. The computing device comprises: a memory storing computer-executable instructions; a communication module for communication with an interaction database and one or more interacting parties via the network, the interaction database storing historical interaction record(s) associated with historical interactions; and at least one processor coupled to the memory and the communication module. The instructions when executed by the at least one processor cause the at least one processor to: determine an interaction settlement due date for an interaction with one of the interacting parties; query, over the network, the interaction database to determine if a number of the historical interaction records related by one or more factors to the interacting party equals or exceeds one historical interaction record, and where the number of related historical interaction records equals or exceeds the one historical interaction record: retrieve from the interaction database historical interaction data from the related historical interaction record(s); determine from the retrieved historical interaction data a predicted processing time for the interaction with the interacting party; and determine, based on the interaction settlement due date and the predicted processing time, the suggested action initiation time. The suggested action initiation time comprises a time by which an action for settling the interaction with the interacting party is suggested to be initiated to effect settlement of the interaction by the interaction settlement due date.

In another aspect of the present application there is provided a non-transitory computer-readable medium for determining a suggested action initiation time for an interaction conducted over a network. The computer-readable medium comprises computer-executable instructions for: determining an interaction settlement due date for an interaction with an interacting party; querying, over the network, an interaction database storing historical interaction record(s) associated with historical interactions, to determine if a number of the historical interaction records related by one or more factors to the interacting party equals or exceeds one historical interaction record, and where the number of related historical interaction records equals or exceeds the one historical interaction record, the computer-executable instructions further for: retrieving from the interaction database historical interaction data from the related historical interaction record(s); determining from the retrieved historical interaction data a predicted processing time for the interaction with the interacting party; and determining, based on the interaction settlement due date and the predicted processing time, the suggested action initiation time. The suggested action initiation time comprises a time by which an action for settling the interaction with the interacting party is suggested to be initiated to effect settlement of the interaction by the interaction settlement due date.

In yet another aspect of the present application there is provided a method for determining a suggested action initiation time for an interaction conducted over a network by a computing device. The computing device comprises at least one processor coupled to a memory and a communication module. The method comprises: determining an interaction settlement due date for an interaction with an interacting party; querying, over the network, an interaction database storing historical interaction records associated with historical interactions, to determine if a number of the historical interaction records related by one or more factors to the interacting party equals or exceeds one historical interaction record, and where the number of related historical interaction records equals or exceeds the one historical interaction record, the method further comprises: retrieving from the interaction database historical interaction data from the related historical interaction record(s); determining from the retrieved historical interaction data a predicted processing time for the interaction with the interacting party; and determining, based on the interaction settlement due date and the predicted processing time, the suggested action initiation time. The suggested action initiation time comprises a time by which an action for settling the interaction with the interacting party is suggested to be initiated to effect settlement of the interaction by the interaction settlement due date.

BRIEF DESCRIPTION OF THE DRAWINGS

Aspects of the application will now be described by way of example only with reference to the appended drawings in which.

DETAILED DESCRIPTION

Figure 1:
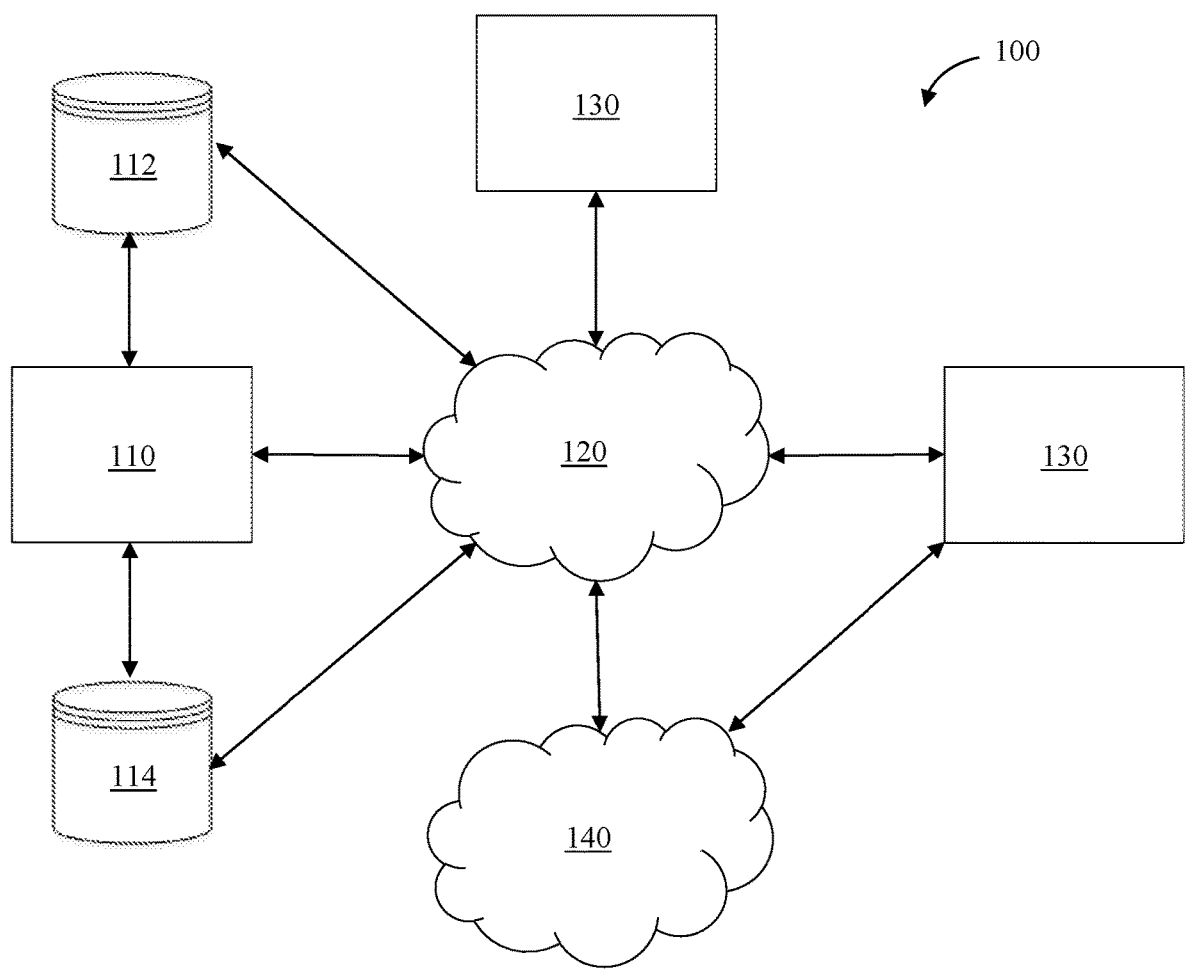
FIG. 1 depicts a schematic diagram of an exemplary aspect of a system described herein.

It will be appreciated that for simplicity and clarity of illustration, where considered appropriate, reference numerals may be repeated among the figures to indicate corresponding or analogous elements. In addition, numerous specific details are set forth in order to provide a thorough understanding of the exemplary aspects of the present application described herein. However, it will be understood by those of ordinary skill in the art that the exemplary aspects described herein may be practiced without these specific details. In other instances, well-known methods, procedures and components have not been described in detail so as not to obscure the exemplary aspects described herein. Also, the description is not to be considered as limiting the scope of the exemplary aspects described herein. Any systems, method steps, devices, media, components, parts of components, and the like described in this application, including in the description and claims of this application, in the singular, are to be interpreted as also including a description of such systems, method steps, devices, media, components, parts of components, and the like in the plural, and vice versa. Further, the person of skill in the art will appreciate that there are delays inherent to any form of communication, including wired or wireless digital communication, including over a digital network, and as such, as used herein, the term "real-time" includes real-time and substantially real-time communication.

The present description generally relates to the determination of suggested action initiation times for digital interactions conducted over digital networks, based on historical interaction data analyzed to determine predicted processing times, so as to effect interaction settlements by the settlement due dates. An interaction may include, for example, the sending and receiving of digital data over a network, such as the Internet, between two interacting parties (in this case, a sending party and a receiving party). For example, it may be necessary to complete or effect transfer of digital application documents to a government entity (e.g., a passport application form) by a particular due date to avoid a penalty (e.g., not receiving a passport in time for preplanned out-of-country travel). The penalty may be imposed by one or the other of the interacting parties, based on input from both of the interacting parties, or established by some other entity or means. For example, in the case of a passport application transmission over the Internet, the deadline for sending the application (or the settlement due date) to the government entity may be imposed by the sending party, based on an application processing time (e.g., 10 business days) communicated on the government entity's website, and the travel departure date (as it would be necessary to have in hand a valid passport prior to the travel departure date).

The sending party may have access to an interaction database containing historical interaction records (consisting of, in this case, as an example, records of processing times for successfully transmitting passport applications to the government entity), and each such record may contain associated data or meta data, such as sending party location. In accordance with an exemplary aspect, historical interaction data from related (e.g., related by the same sending party location in this example) historical interaction records in the database (which may comprise processing times for transmitting passport applications over the Internet to the government entity from the sending party's town, city or state, for example) may be used to determine a predicted processing time for transmitting the passport application (e.g., the predicted processing time may comprise the average of all of the processing times in the related historical interaction records). It may be determined that passport applications transmitted from the sending party's location tend to take a day before successful receipt of the application by the government entity (perhaps due to a security measure at the government entity's network, the sending party location comprising an unreliable network infrastructure, or both, for example). As such, while the sending party may establish a settlement due date that is 10 business days prior to the day before the travel departure date, in this example a suggested action initiation time may be determined to be 10 business days, plus 1 additional day, prior to the day before the travel departure date, to increase the chances of the government entity receiving the passport application by the required 10-day lead time.

Figure 2:
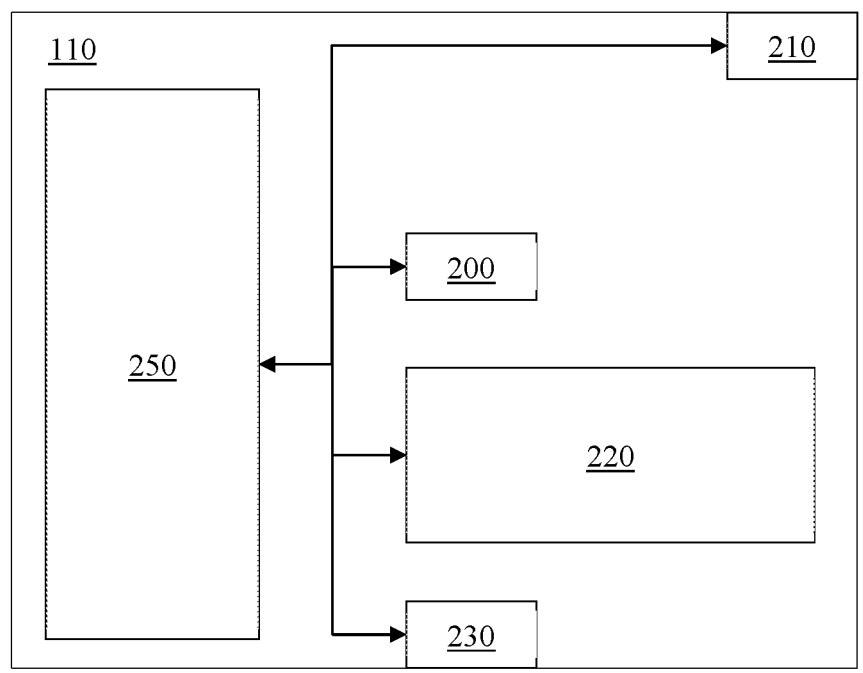
FIG. 2 depicts a schematic diagram of an exemplary aspect of a computing device described herein.

With reference to FIG. 1 and FIG. 2, system 100 includes a computing device 110 for determining a suggested action initiation time for an interaction conducted over a network 120 between a user of computing device 110 and an interacting party 130. Computing device 110 may comprise any device, apparatus, machine, computer, server, or network, such as a desktop computer, laptop, tablet, mobile device (e.g., a mobile phone or smart phone), and the like, capable of executing digital instructions, such as software code or programing, and may comprise memory 200, communication module 210, a display 220, one or more input devices 230, and at least one processor 250 coupled to the memory 200, communication module 210, display 220, and input device(s) 230.

As used herein, "interacting party" may comprise a person, corporation, business, or other entity with which or with whom a user of computing device 110 has interacted (such as a retail store where the user carried out a financial transaction using a credit card of the retailer), and a computing device (as described herein) of such a person, corporation, business, or other entity, with which computing device 110 may interact over network 120. Communication module 210 enables computing device 110 to communicate with one or more other components of system 100, such as one or more interacting parties 130, or one or more databases, such as interaction database 112 and invoice database 114 (further described, below), via a wired or wireless connection, such as over network 120. Network 120 may comprise a direct link between communicating components of system 100, or an indirect one, including but not limited to communication by Ethernet™, Bluetooth™, WiFi™, NFC (near-field communication), infrared, WiMAX™ (fixed or mobile), RFID (radio-frequency identification), and any suitable cellular communications protocols including, but not limited to, up to 5G protocols, such as GSM, GPRS, EDGE, CDMA, UMTS, LTE, LTE-A, IMS, for example, and any other communications protocols suitable for the method(s), system(s) and device(s) described herein, including any proprietary protocols. Network 120 may comprise a single network or more than one interconnected network, of any type suitable for the method(s), system(s) and device(s) described herein, including but not limited to wired or wireless PANs (personal area networks), LANs (local area networks), WANs (wide area networks), MANs (metropolitan area networks), mesh or ad hoc networks, VPNs (virtual private networks), the Internet, and any other suitable network type, in any suitable network configuration or topology (e.g., mesh, token ring, tree, star, etc.). Although not shown in FIG. 1, system 100 may further include any components necessary to effect the communication and/or network type(s) used, and may also include components for increased network security, for example, access points, routers, and firewalls.

As used herein, the term "memory", or any variation thereof, may comprise a tangible and non-transitory computer-readable medium (i.e., a medium which does not comprise only a transitory propagating signal per se) comprising or storing computer-executable instructions, such as computer programs, sets of instructions, code, software, and/or data for execution of any method(s), step(s) or process(es) described herein by any processor(s) described herein, including processor(s) 250. As used herein, the terms "processor", "processors" or "processor(s)" may refer to any combination of processors of the computing device 110, interacting party 130, and of any other component of system 100, suitable for carrying out method step(s) described herein. Memory may comprise one or more of a local and/or remote hard disk or hard drive, of any type, ROM (read-only memory) and/or RAM (random-access memory), buffer(s), cache(s), flash memory, optical memory (e.g., CD(s) and DVD(s)), and any other form of volatile or non-volatile storage medium in or on which information may be stored for any duration. Such computer-executable instructions, when executed by processor(s) described herein, cause the processor(s) to perform any of the methods described herein, such as methods for determining suggested action initiation times for interactions conducted over network 120 with interacting parties 130. It will be appreciated that the method steps described herein may be implemented in a variety of programming languages.

As used herein, the term "input device" or "input interface" (or any variation thereof or like term) may refer to any input device(s) of computing device 110 (input device(s) 230) and/or input device(s) of any other system component (not shown)). The input device(s) provide a mechanism for a user of system 100 (such as a user of computing device 110 or any other system component, as required to carry out method step(s) described herein), to provide input(s), such as during the execution of computer programs stored in memory. Input device(s) may include a touch-sensitive display, physical or virtual keyboard, keypad, mouse, microphone, trackpad, scroll wheel or ball, or other suitable device capable of receiving or detecting an input. Display 220 may comprise any screen suitable for displaying visual information, including any suitable touch-sensitive display, such as a capacitive, resistive, infrared, surface acoustic wave (SAW) touch-sensitive display, strain gauge, optical imaging, dispersive signal technology, acoustic pulse recognition, and so forth, as is known in the art. In such cases display 220 may also serve as an input device 230 of computing device 110.

Furthermore, while in certain aspects a software application running on computing device(s) 110 (and/or on any other suitable component(s) of system 100) may be executed by processor(s) to carry out method step(s) described herein, in other aspects, the software application running on computing device(s) 110 (or any other suitable component(s) of system 100) may comprise a client instance of a software application running on one or more servers of system 100, such as a financial software application, hosted by a server of a financial institution (such as a bank), running on a mobile device of a user for effecting interactions or financial transactions with merchants (the interacting parties) over network 120 (e.g., a banking "app"). It will be appreciated that method step(s) described herein may be carried out by processor(s) of the computing device (i.e., processor(s) 250) and/or of any other suitable component of system 100, such as server(s) hosting software applications (such as a banking "app") which may be accessible on computing device 110 or via some other device.

System 100 may also include one or more interaction databases 112 storing historical interaction record(s) associated with historical interactions. The interaction database (and any other database described herein) may be accessible by communication module 210 of computing device 110 via network 120, or may be co-located with computing device 110 such that it is directly accessible by computing device 110 by wired or wireless connection, or computing device 110 may itself maintain the database, or a copy thereof, in memory 200. The databases described herein may comprise simple tables, text files, relational database management systems (RDBMS), XML databases, or any other suitable form of database, as would be known to the person of skill in the art. The historical interaction records may pertain to only a user of computing device 110, or to multiple users. For example, in the example of a financial interaction or transaction, computing device 110 may have access, via a banking "app", to an interaction database 112 storing transaction or interaction records for all users or customers of the bank hosting the banking application.

Figure 3:
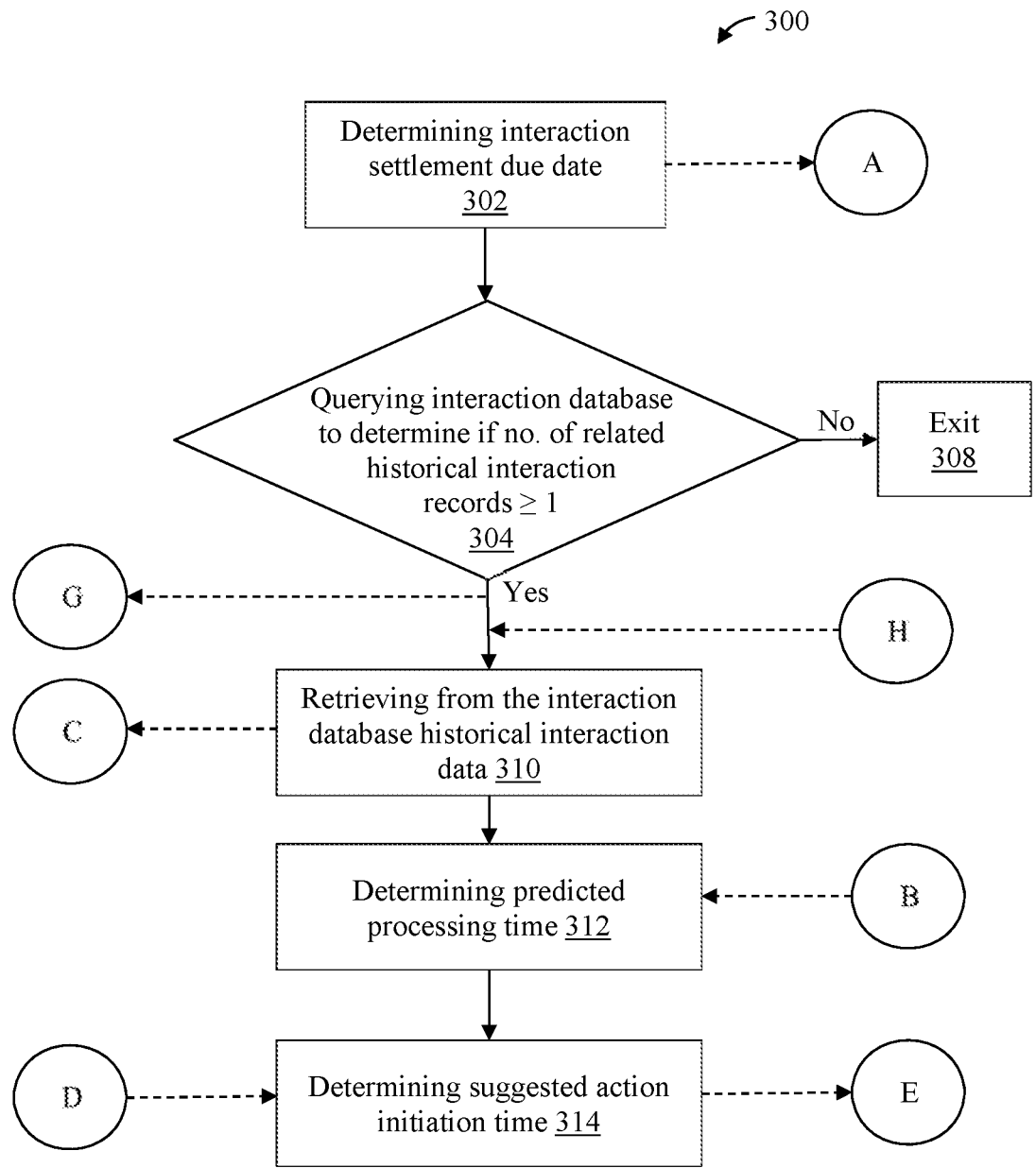
FIG. 3 depicts a flow diagram of an exemplary aspect of computer-executable instructions described herein.

Referring to FIG. 3, where a user of computing device 110 has engaged with an interacting party (such as by using the interacting party's credit card (in this case the interacting party may be, e.g., VISA®, Mastercard®, a retailer with an associated private-label retail credit card, etc.) to purchase a product), in accordance with an exemplary aspect of the present application, the instructions when executed by processor(s) (such as processor(s) 250) cause the processor(s) to carry out steps of method 300, to determine a suggested action initiation time for an interaction conducted over network 120 (in the context of a financial interaction or transaction, the interaction may comprise an invoice payment) with the interacting party. The suggested action initiation time comprises a time by which an action (such as a digital payment over network 120) for settling the interaction with the interacting party is suggested to be initiated to effect settlement of the interaction by the interaction settlement due date (e.g., a payment due date).

Method 300 comprises: determining 302 an interaction settlement due date for an interaction with an interacting party (e.g., where the interaction comprises a financial transaction, such as a bill payment, the interaction settlement due date may comprise a payment due date for an invoice amount associated with an invoice of the interacting party); and querying 304, over network 120, the interaction database 112 to determine if a number of the historical interaction records related by one or more factors to the interacting party 130 is greater than or equal to one related historical interaction record.

Where there are no related historical interaction records, method 300 exits 308. Where there is one or more related historical interaction record(s), the instructions when executed by processor(s) (such as processor(s) 250) cause the processor(s) to carry out further steps of method 300, comprising: retrieving 310 from the interaction database historical interaction data from the related historical interaction record(s); determining 312 from the retrieved historical interaction data a predicted processing time for the interaction with the interacting party; and determining 314, based on the interaction settlement due date and the predicted processing time, the suggested action initiation time.

Figure 7:
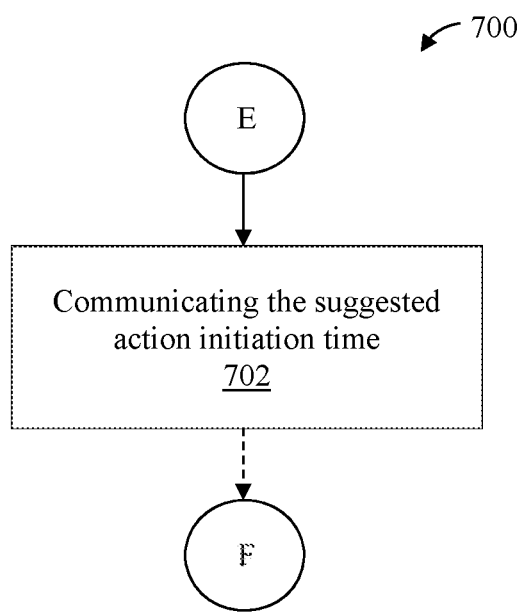
FIG. 7 depicts a flow diagram of another exemplary aspect of computer-executable instructions described herein.

With reference to FIG. 3 and FIG. 7, in accordance with another aspect, the instructions when executed by processor(s) (such as processor(s) 250) may cause the processor(s) to carry out method 700, which continues on from method 300 at "E". Method 700 comprises communicating 702 the suggested action initiation time, such as to computing device 110 and/or to a user of computing device 110. The suggested action initiation time may be communicated 702 by, e.g., a message displayed on display 220 of computing device 110, or a message sent via communication module 210, or by a server hosting a software application (such as a banking "app") on computing device 110, to a digital address of the user (e.g., SMS, MMS, instant message, email, a proprietary message type, etc.). It will be appreciated by the person skilled in the art that any suitable type of message may be used. Further, the suggested action initiation time may be communicated by updating an invoice for the interaction (where the interaction is, e.g., a financial transaction with an associated invoice) with a suggested payment date. The suggested payment date may comprise a date that corresponds to the suggested action initiation time, and may be displayed (e.g. on the invoice itself, or on a graphical user interface associated with a banking "app" that displays aspects of the invoice) in place of, or in addition to, the payment due date of the invoice.

The historical interaction data may comprise data and/or meta data comprising, for each of the historical interaction records, e.g., at least one of a unique interacting party ID, processing time, a settlement mechanism (e.g., payment type), payment amount, time of day of payment, time of year (i.e. date) of payment, interacting party location, and location of computing device 100 (e.g., a paying party location). The historical interaction data may further comprise any other information or data that could potentially affect the time it would take for an action (such as a payment) to be received by an interacting party.

"Processing time", as used herein, refers to the time taken from the initiation of an action to settle an interaction (such as submitting an online bill payment) to the time that the interacting party receives the action (e.g., payment) for the purposes of establishing an action receipt date (e.g., a payment receipt date). The action receipt date may, in some cases, be a date that the computing device 110 receives from the interacting party 130 a digital message acknowledging receipt of the action. It will be appreciated that even where receipt of the digital acknowledgement message by the computing device is delayed, so as to suggest a longer processing time than the actual time taken for the interacting party to receive the action (e.g., payment), such would result in processing time data in the historical interaction data that is longer, and not shorter, than the actual processing time, and so any suggested action initiation time based on such information would not tend to be erroneously shorter than required by reason alone of the inaccuracy in the processing time data. The skilled person would understand that a suggested action initiation time that is longer than required would still aid, for example, in making timely bill payments so as to avoid late payment fees.

As described above, in the context of a financial interaction (e.g., a financial transaction), such as a credit card invoice payment to VISA®, computing device 110 of the user may have access, via a banking "app", to interaction database 112, and the interaction database may contain transaction or interaction records for all users or customers of the bank hosting the banking application. The factor(s) relating the historical interaction records in interaction database 112 to the interacting party may include, e.g., a unique interacting party ID. For example, VISA® may be assigned the unique ID of "23354" in interaction database 112. In this example, at step 304, when interaction database 112 is queried to determine a number of the historical interaction records related by one or more factors (here, the unique interacting party ID of 23354) to the interacting party, VISA®, it may be determined that there are none (i.e. no records of prior payments to VISA®), one, or some other number. For example, if there is one historical interaction record related to VISA®, then the predicted processing time may be based on the historical interaction data retrieved from only one prior record (i.e., the predicted processing time for VISA® to receive an online payment may be determined on the basis of only one prior record's data or historical interaction data).

Figure 4:
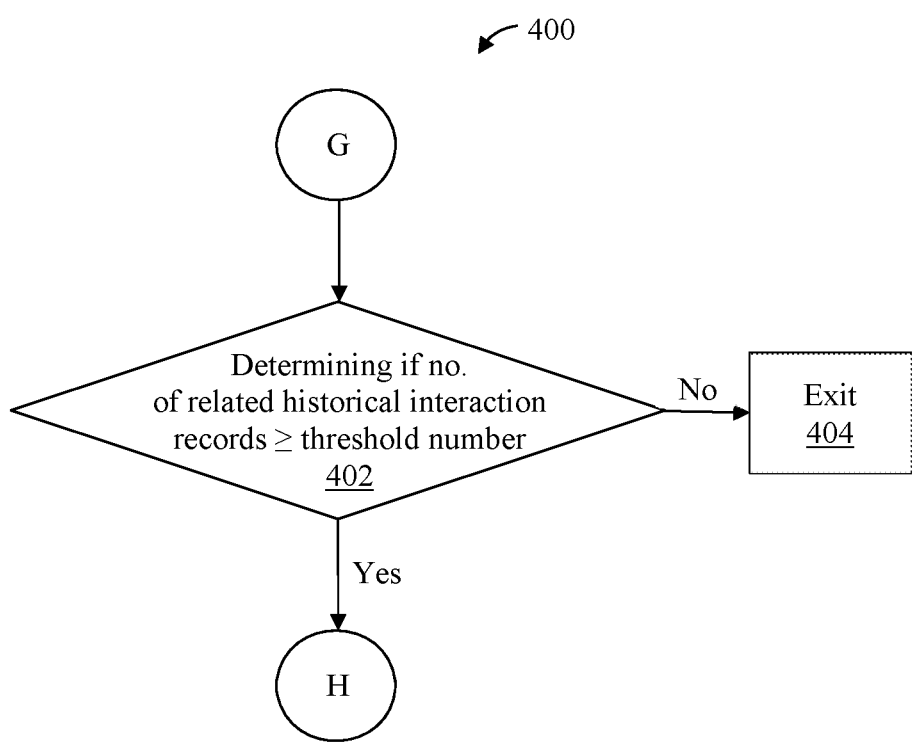
FIG. 4 depicts a flow diagram of another exemplary aspect of computer-executable instructions described herein.

With reference to FIG. 3 and FIG. 4, in another exemplary aspect, method 300 may proceed to method 400 at "G", such that after it is determined 304 that there is at least one historical interaction record in the interaction database 112 related to the interacting party 130 by one or more factors, it is determined 402 if the number of related historical interaction records equals or exceeds a threshold number. Where the number of related historical interaction records is below the threshold number, method 400 exits 404. Where the number of related historical interaction records equals or exceeds the threshold number, method 400 may proceed to method 300 at "H", to continue on to step 310. The threshold number may be configured, or pre-programed, with any integer value (including, e.g., "1"), and further, may have a default value, such as, e.g., 10, 50, 100, or 10,000. It will be appreciated that the greater the number of historical interaction records in interaction database 112 that are related to the interacting party by one or more factors (such as the interacting party ID), the greater the statistical confidence, or confidence interval, which may be had in the predicted processing time and the suggested action initiation time. As such, it is expected that a higher threshold number may yield more accurate suggested action initiation times for effecting actions (such as payments) by settlement due dates (such as invoice payment due dates).

Greater confidence in the predicted processing time and the suggested action initiation time may also be obtained by basing the step of determining 312 the predicted processing time on the historical interaction data of historical interaction records that are related to the interacting party by multiple factors (e.g., the unique interacting party ID, settlement mechanism (e.g., payment type), payment amount, time of day of payment, time of year (i.e. date) of payment, interacting party location, location of computing device 110 (e.g., a paying party location), etc.). For example, in the case of a financial transaction interaction with a payment due date within the month of December, historical interaction records also from the month of December (or within a configurable date range of the payment due date, e.g., +/−5 days) may reflect more accurate processing times in North America, e.g., where the month of December may have an associated increase in volume in financial transactions which, in turn, may result in generally slower processing times. It will be further appreciated that at step 304, when interaction database 112 is queried to determine if a number of the historical interaction records related by one or more factors to the interacting party is greater than or equal to one historical interaction record, the one or more factors for defining such relationship would not include the processing times for the historical interaction records; other factors, as noted above, may be correlated to define the relationship between the interacting party and the historical interaction records, while the processing time data for each of those related historical interaction records is retrieved (potentially with other historical interaction data) at step 310 of method 300 to determine 312 the predicted processing time based on those related records.

For example, in an exemplary aspect, at step 310, the historical interaction data retrieved from the related historical interaction records may comprise the processing times of each of the related historical interaction records. The instructions when executed by processor(s) (such as processor(s) 250) may cause the processor(s) to carry out any function on the retrieved data to determine therefrom the predicted processing time. For example, the retrieved processing times may be averaged to yield the predicted processing time. As another example, the longest retrieved processing time may be established as the predicted processing time. The manner in which the retrieved historical interaction data is processed to yield the predicted processing time may be configurable, and it may also be configurable whether more than one predicted processing time is determined (and whether more than one suggested action initiation time is determined and ultimately, communicated 702 to computing device 110 and/or to a user of computed device 110). Any configurable settings described herein may be configured, e.g., through a graphical user interface (GUI) of an application (e.g., a banking "app") running on a user's computing device 110, where configuration changes may be made, e.g., by an input device 230, such as a touch input on a touch screen, of computing device 110, or by input to an access terminal or computer for accessing a GUI of the software application by some means other than the GUI on computing device 110 (such as a web portal that allows a user to access his or her account for the software application from any computer having a connection to network 120).

In another exemplary aspect, at step 310, the historical interaction data retrieved from the related historical interaction records may comprise the processing times and the settlement mechanisms of each of the related historical interaction records. The settlement mechanisms may comprise—in the context of historical interaction records that represent financial transactions—payment types. A payment type may comprise, e.g., at least one of direct money transfer, email money transfer, money order, wire transfer, cash, check, payment via a third party payment network 140 (such as Interac® or a credit card payment network (e.g., VISA®, Mastercard®, American Express®, Discover®, etc.)), and/or any other form or manner of payment, as would be known to the skilled person. For example, the retrieved processing times may be grouped by payment types, with an average (or, e.g., longest) processing time determined per payment type group (e.g., it may be determined that the average processing time for Interac payments is 10 seconds, the average processing time for domestic wire transfer is 1 business day, and the average processing time for international wire transfer is 5 business days). In a further exemplary aspect, with reference to FIG. 7, in such a scenario, the suggested action initiation time may be communicated 702 by updating an invoice for the interaction (where the interaction is, e.g., a financial transaction with an associated invoice) with multiple suggested payment dates, one for each settlement mechanism or payment type. For example, the amended invoice may indicate a payment due date of Sep. 21, 2017, and further indicate a suggested payment date of Sep. 21, 2017 if paying by Interac® (perhaps by a certain time, e.g., 11 pm, to help ensure payment is effected on Sep. 21, 2017 and not Sep. 22, 2017, and the instructions when executed may impose such a time-of-day restriction (which may be configurable or pre-programmed) in any scenario, including in any of the scenarios described herein), Sep. 20, 2017 if paying by domestic money transfer, and Sep. 15, 2017 if paying by international wire transfer (accounting for the weekend that falls within the 5-business day range).

Further still, where the historical interaction data retrieved from the related historical interaction records also comprises the interacting party location, the instructions when executed by processor(s) (such as processor(s) 250) may cause the processor(s) to determine (such as by use of GPS) the paying party location, and accordingly determine if the payment would be an international one. If it is determined that the payment would be an international payment, the suggested payment date for domestic wire transfer may, e.g., be omitted. If the retrieved historical interaction data further comprises paying party locations, it would be expected that further accuracy in the predicted processing time may be achieved by retrieving historical interaction records where the payments were from paying parties in the same location as that of computing device 110, to interacting party locations that are the same as the location of the interacting party 130 for the interaction.

Figure 5:
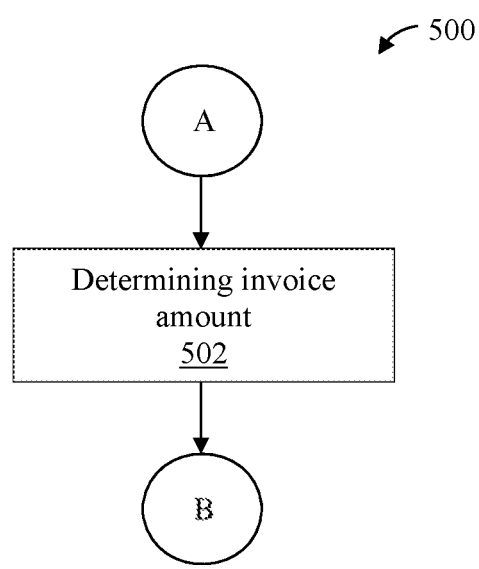
FIG. 5 depicts a flow diagram of another exemplary aspect of computer-executable instructions described herein.

In the case of a financial transaction interaction for which there is an associated invoice, computing device 110 may, using communication module 210, query invoice database 114 (either over network 120 or by direct connection, or, alternatively, invoice database 114 (and any other database described herein), or a copy thereof, may be collocated with computing device 110 and/or stored in memory 200 of computing device 110) to retrieve an invoice for the user of computing device 110, and/or relevant information therefrom. In a further example, the historical interaction data retrieved from the related historical interaction records may comprise, or further comprise, payment amounts for each of the historical interaction records. Referring to FIG. 3 and FIG. 5, method 300 may proceed to method 500 at "A". The instructions when executed by processor(s) (such as processor(s) 250) may cause the processor(s) to determine 502, from the invoice, the invoice amount. Further relevant information may also be determined from the invoice, such as the interacting party, the interaction settlement due date (e.g., payment due date), as shown at step 302 of method 300, and/or any other relevant information which may be determined from the invoice. After step 502, method 500 may proceed to method 300 at "B". In this scenario, the step of determining 312 the predicted processing time may be further based on the invoice amount determined at step 502. For example, the instructions may further cause the processor(s) to determine all of the historical interaction record(s) related to the interacting party having payment amounts that match, or are within a pre-defined or configurable margin (e.g., +/−%5, or +/−$100) of the invoice amount, and to average the processing times of those records, determine the longest processing time from amongst those records, or perform some other calculation or derive some other metric from those records. It will be appreciated that method 500 may also be considered to proceed to method 300 at, e.g., step 304 (where the historical interaction records queried are related to the interacting party 130 by at least the payment amounts and their correlation to the invoice amount, as described above), and further, that the placement or ordering of the letter references A, B, C, D, E, F, G, and H in the drawings are to demonstrate particular examples only, and that other placements or orderings of such letter references may be possible.

Figure 6:
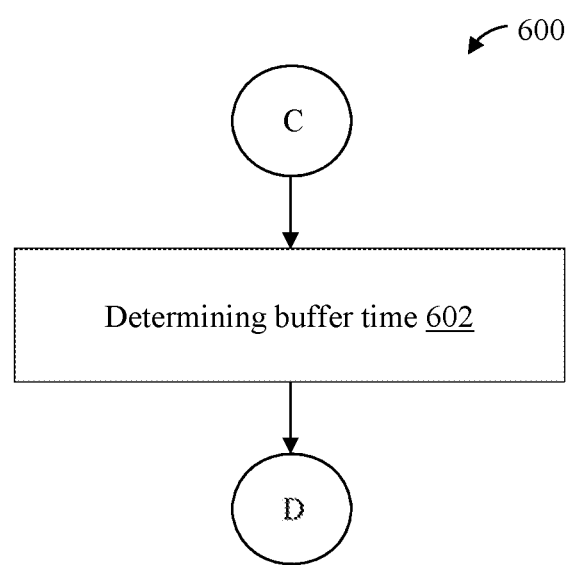
FIG. 6 depicts a flow diagram of another exemplary aspect of computer-executable instructions described herein.

Referring to FIG. 3 and FIG. 6, method 300 may proceed to method 600 at "C". In an exemplary aspect, where the historical interaction data retrieved from the historical interaction records related to the interacting party also comprise the interacting party location, the instructions when executed by the processor(s) (such as processor(s) 250) may cause the processor(s) to determine 602, e.g., based on the interacting party location or other information, a buffer time accounting for unpredictability in processing time associated with the interacting party location or other information. Locations having associated buffer times, and the values of those buffer times, may be determined by a list of locations (of any degree of granularity, e.g., from particular addresses to entire countries or territories) and related buffer times, which may be pre-programed or configurable into a database accessible by computing device 110, such as a database stored in memory 200, or a database associated with a server hosting the software application (e.g., a banking "app") running on computing device 110, or some other database accessible over network 120. Alternatively, whether an interacting party location should have an associated buffer time, and the value assigned to that buffer time, may be determined by the processor(s) in real-time, e.g., when the historical interaction data is retrieved 310 from the historical interaction records related to the interacting party 130. For example, the processor(s) may determine, from the historical interaction data (or, alternatively or additionally, such information may be pre-programmed or preconfigured), that certain locations do not tend to have generally consistent processing times. This may be due, e.g., to unreliability in the network infrastructure associated with a location, or for some other reason. After step 602, method 600 may proceed to method 300 at "D" for step 314. With reference to FIG. 3, where buffer time(s) are determined 602 (including where they are pre-established), the step of determining 314 the suggested action initiation time may be further based on the buffer time. For example, the instructions when executed may cause the processor(s) to average the processing times for all of the retrieved historical interaction records related to the interacting party, and determine at that time that the interacting party location does not tend to have generally consistent processing times associated with it and accordingly, generate an associated buffer time, or, may cross-reference a database to determine if the interacting party location has a pre-established buffer time. The instructions may then cause the processor(s) to determine 314 the suggested action initiation time based both on the predicted processing time and the buffer time. For example, where an invoice has a payment due date of Sep. 21, 2017, and the predicted processing time is determined to be 1 day while the buffer is determined to be or is pre-established as 2 days, then the suggested action initiation time (and the suggested payment date) would be 3 days prior to the payment due date, or Sep. 18, 2017.

It will be appreciated that generally inconsistent processing times may be associated with or based on attributes in the historical interaction data other than the interacting party location, and further, that buffer times may be established or determined 602 simply on the basis of generally inconsistent processing times, irrespective of the interacting party location. Further, the computing device location (e.g., paying party location), as determined by, e.g., GPS, may be pre-established in a database as a location with an associated buffer time or, based on the retrieved historical interaction data, it may be determined that processing times associated with the paying party's location are generally inconsistent (based on inconsistent processing times seen in records involving that location, whether it is the location of the paying party or of the interacting party). In such a scenario also, the buffer time may be added at step 314. The extent of variation in the processing times required to trigger a determination that the processing times are generally inconsistent, such that a buffer time is required, may be a configurable setting or pre-programmed.

It will be appreciated that various other ways to manipulate the historical interaction data to determine 312 a predicted processing time may exist, and only a few examples of such have been presented above. Further, the instructions when executed may utilize a regression analysis to determine the predicted processing time, and it is expected that the use of artificial intelligence and/or machine learning (such as decision trees, multinomial logit models, Naïve Bayes algorithms, etc.) to make the determination at step 312 may tend to increase the accuracy in the predicted processing time determined.

Figure 8:
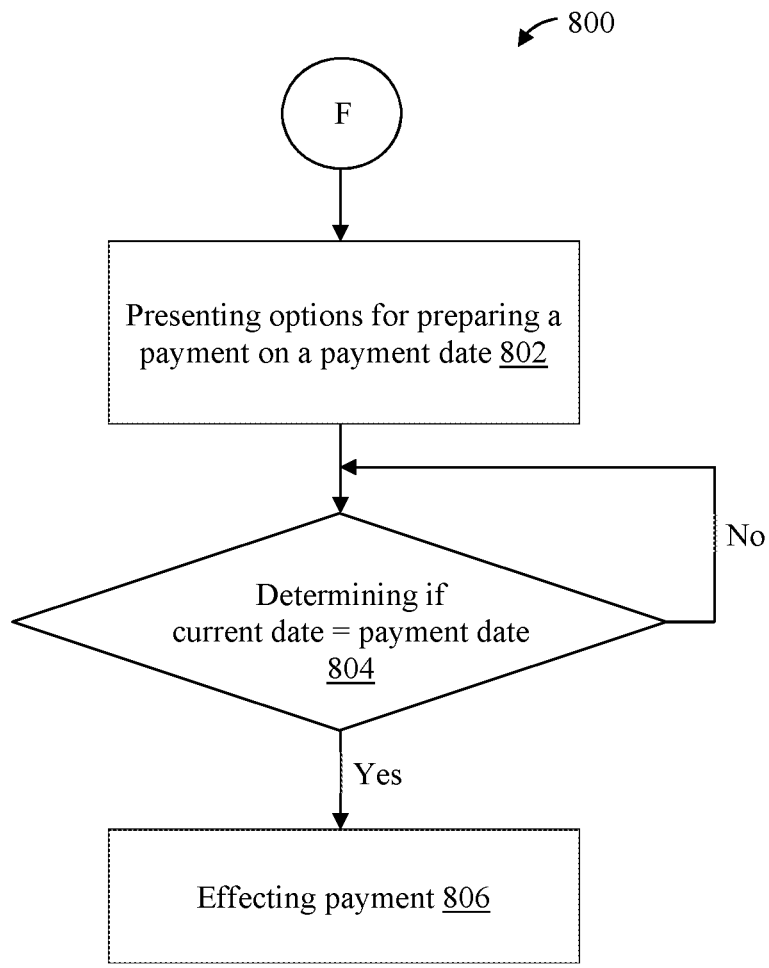
FIG. 8 depicts a flow diagram of another exemplary aspect of computer-executable instructions described herein.

In a further aspect, and with reference to FIG. 7 and FIG. 8, method 700 may proceed to method 800 at "F". In accordance with this exemplary aspect, in the example of a financial transaction interaction, the instructions when executed by processor(s) (including processor(s) 250) may cause the processor(s) to present 802 (on any interface through which, e.g., a software application (such as a banking "app") for carrying out method step(s) described herein is accessible (such as on display 220 of computing device 110 on which the banking "app" is accessible)), options (which may be selectable options) for preparing a payment of, e.g., the invoice amount, or perhaps another amount which may be entered or selected by a user of computing device 110, on a payment date that comprises at least the payment due date or the suggested payment date. In a further aspect, an alternative date to the payment due date and the suggested payment date may also be entered or selected by the user as the payment date, or the user may choose not to pay any amount at all. In this example, the instructions when executed by processor(s) (including processor(s) 250) may cause the processor(s) to determine 804 when the current date is the payment date, and on the payment date, effect payment 806 (such as by messaging and/or authorizing a financial server hosting the banking "app" to pay the amount chosen or entered (such as the invoice amount) to the interacting party 130).

While the foregoing has been described in some detail for purposes of clarity and understanding, it will be appreciated by those skilled in the relevant arts, once they have been made familiar with this disclosure, that various changes in form and detail can be made without departing from the true scope of the appended claims. The present application is therefore not to be limited to the specific examples, or the exact components or details of methodology or construction, set forth above. Except to the extent necessary or inherent in the processes themselves, no particular order to steps or stages of methods or processes described in this disclosure, including in the Figures, is intended or implied, including with respect to the letter references A, B, C, D, E, F, G, and H shown in the Figures. In many cases, the order of process or method steps, as well as of the above-noted letter references, may be varied, and/or made sequential or parallel, without changing the purpose, effect, or import of the method(s) described.

The invention claimed is:

1. A computing device for determining a suggested action initiation time for an interaction conducted over a network, the computing device comprising:
   a memory storing computer-executable instructions;
   a communication module for communication with an interaction database and one or more interacting parties via the network, the interaction database storing historical interaction record(s) associated with historical interactions; and
   at least one processor coupled to the memory and the communication module, the instructions when executed by the at least one processor causing the at least one processor to:
      determine an interaction settlement due date for an interaction with one of said interacting parties;
      query, over the network, the interaction database to determine if a number of the historical interaction records related by one or more factors to the interacting party equals or exceeds one historical interaction record, and where the number of related historical interaction records equals or exceeds said one historical interaction record:
         retrieve from the interaction database historical interaction data from the related historical interaction record(s);
         determine from the retrieved historical interaction data a predicted processing time for the interaction with the interacting party; and
         determine, based on the interaction settlement due date and the predicted processing time, the suggested action initiation time;
   wherein the suggested action initiation time comprises a time by which an action for settling the interaction with the interacting party is suggested to be initiated to effect settlement of the interaction by the interaction settlement due date;
   wherein the historical interaction data comprises, for each of the related historical interaction record(s), interacting party location and processing time;
   wherein the instructions when executed by the at least one processor further cause the at least one processor to:
      determine, based on (i) the interacting party location and/or a computing device location, by reference to a buffer database comprising pre-established buffer times for one or more locations, and/or (ii) an average of the processing times from the retrieved historical interaction data from the related historical interaction record(s), a buffer time accounting for unpredictability in processing time associated with the interacting party location and/or the computing device location, wherein said determining the suggested action initiation time is further based on the buffer time; and
      communicate to a user of the computing device the suggested action initiation time.

2. The computing device of claim 1 wherein the interaction comprises a financial transaction and the interaction settlement due date comprises a payment due date for an invoice amount associated with an invoice of the interacting party.

3. The computing device of claim 2 wherein the historical interaction data further comprises, for each of the historical interaction records, at least one of: a unique interacting party ID, payment amount, time of day of payment, date of payment, paying party location, and a settlement mechanism, wherein the paying party location comprises the computing device location.

4. The computing device of claim 3 wherein the one or more factors relating the historical interaction records to the interacting party include the unique interacting party ID.

5. The computing device of claim 3 wherein the settlement mechanism comprises a payment type, the payment type comprising at least one of: direct money transfer, email money transfer, money order, wire transfer, cash, check, and payment via a third party payment network.

6. The computing device of claim 3 wherein the historical interaction data includes the payment amounts for each of the historical interaction records, wherein the instructions when executed by the at least one processor further cause the at least one processor to determine, from the invoice, the invoice amount, and wherein the step of determining the predicted processing time is further based on the invoice amount.

7. The computing device of claim 2 wherein the instructions when executed by the at least one processor further cause the at least one processor to determine if the number of related historical interaction record(s) equals or exceeds a threshold number, and wherein the historical interaction data from the related historical interaction record(s) is retrieved from the interaction database if the number of related historical interaction records equals or exceeds the threshold number.

8. The computing device of claim 1 wherein the processor communicates the suggested action initiation time by updating the invoice for the interaction with a suggested payment date that comprises a date corresponding to the suggested action initiation time, the instructions when executed by the at least one processor further causing the at least one processor to present options for preparing a payment on a payment date, the payment date comprising at least the payment due date or the suggested payment date.

9. A non-transitory computer-readable medium for determining a suggested action initiation time for an interaction conducted over a network between a computing device and an interacting party, the computer-readable medium comprising computer-executable instructions for:
   determining an interaction settlement due date for the interaction with the interacting party;
   querying, over the network, an interaction database storing historical interaction record(s) associated with historical interactions, to determine if a number of the historical interaction records related by one or more factors to the interacting party equals or exceeds one historical interaction record, and where the number of related historical interaction records equals or exceeds said one historical interaction record, the computer-executable instructions further for:
      retrieving from the interaction database historical interaction data from the related historical interaction record(s);
      determining from the retrieved historical interaction data a predicted processing time for the interaction with the interacting party; and
      determining, based on the interaction settlement due date and the predicted processing time, the suggested action initiation time;

wherein the suggested action initiation time comprises a time by which an action for settling the interaction with the interacting party is suggested to be initiated to effect settlement of the interaction by the interaction settlement due date;

wherein the historical interaction data comprises, for each of the related historical interaction record(s), interacting party location and processing time;

the computer-executable instructions further for:
determining, based on (i) the interacting party location and/or a computing device location, by reference to a buffer database comprising pre-established buffer times for one or more locations, and/or (ii) an average of the processing times from the retrieved historical interaction data from the related historical interaction record(s), a buffer time accounting for unpredictability in processing time associated with the interacting party location and/or the computing device location, wherein said determining the suggested action initiation time is further based on the buffer time; and communicating to a user of the computing device the suggested action initiation time.

10. The non-transitory computer-readable medium of claim 9 wherein the interaction comprises a financial transaction and the interaction settlement due date comprises a payment due date for an invoice amount associated with an invoice of the interacting party.

11. The non-transitory computer-readable medium of claim 10 wherein the historical interaction data further comprises, for each of the historical interaction records, at least one of: a unique interacting party ID, payment amount, time of day of payment, date of payment, paying party location, and a settlement mechanism, wherein the paying party location comprises the computing device location.

12. The non-transitory computer-readable medium of claim 11 wherein the settlement mechanism comprises a payment type, the payment type comprising at least one of: direct money transfer, email money transfer, money order, wire transfer, cash, check, and payment via a third party payment network.

13. The non-transitory computer-readable medium of claim 10, the computer-executable instructions further for determining if the number of related historical interaction record(s) equals or exceeds a threshold number, wherein the historical interaction data from the related historical interaction record(s) is retrieved from the interaction database if the number of related historical interaction record(s) equals or exceeds the threshold number.

14. The non-transitory computer-readable medium of claim 9, the computer-executable instructions further for:
communicating to the computing device the suggested action initiation time by updating the invoice for the interaction with a suggested payment date that comprises a date corresponding to the suggested action initiation time; and presenting options for preparing a payment on a payment date, the payment date comprising at least the payment due date or the suggested payment date.

15. A method for determining a suggested action initiation time for an interaction conducted over a network by a computing device, the computing device comprising at least one processor coupled to a memory and a communication module, the method comprising:
determining an interaction settlement due date for an interaction with an interacting party;

querying, over the network, an interaction database storing historical interaction records associated with historical interactions, to determine if a number of the historical interaction records related by one or more factors to the interacting party equals or exceeds one historical interaction record, and where the number of related historical interaction records equals or exceeds said one historical interaction record, the method further comprising:
retrieving from the interaction database historical interaction data from the related historical interaction record(s);

determining from the retrieved historical interaction data a predicted processing time for the interaction with the interacting party; and determining, based on the interaction settlement due date and the predicted processing time, the suggested action initiation time;

wherein the suggested action initiation time comprises a time by which an action for settling the interaction with the interacting party is suggested to be initiated to effect settlement of the interaction by the interaction settlement due date;

wherein the historical interaction data comprises, for each of the related historical interaction record(s), interacting party location and processing time;

the method further comprising:
determining, based on (i) the interacting party location and/or a computing device location, by reference to a buffer database comprising pre-established buffer times for one or more locations, and/or (ii) an average of the processing times from the retrieved historical interaction data from the related historical interaction record(s), a buffer time accounting for unpredictability in processing time associated with the interacting party location and/or the computing device location, wherein said determining the suggested action initiation time is further based on the buffer time; and communicating to a user of the computing device the suggested action initiation time.

16. The method of claim 15 wherein the interaction comprises a financial transaction and the interaction settlement due date comprises a payment due date for an invoice amount associated with an invoice of the interacting party.

17. The method of claim 16 wherein the historical interaction data further comprises, for each of the historical interaction records, at least one of: a unique interacting party ID, payment amount, time of day of payment, date of payment, paying party location, and a settlement mechanism, wherein the paying party location comprises the computing device location.

18. The method of claim 17 wherein the settlement mechanism comprises a payment type, the payment type comprising at least one of: direct money transfer, email money transfer, money order, wire transfer, cash, check, and payment via a third party payment network.

19. The method of claim 16 further comprising:
updating the invoice for the interaction with a suggested payment date that comprises a date corresponding to the suggested action initiation time; and presenting options for preparing a payment on a payment date, the payment date comprising at least the payment due date or the suggested payment date.

20. The method of claim 16 further comprising determining if the number of related historical interaction record(s) equals or exceeds a threshold number, wherein the historical interaction data from the related historical interaction record(s) is retrieved from the interaction database if the number of related historical interaction record(s) equals or exceeds the threshold number.

\* \* \* \* \*